United States Patent
Chiu et al.

(10) Patent No.: US 11,630,582 B2
(45) Date of Patent: *Apr. 18, 2023

(54) STORAGE SYSTEM STORING A PLURALITY OF DISK FILES WHICH CORRESPOND TO A PLURALITY OF VIRTUAL DISKS AND ACCESS CONTROL METHOD THEREOF

(71) Applicant: Silicon Motion Technology (Hong Kong) Limited, Kowloon (HK)

(72) Inventors: Kuan-Kai Chiu, Taipei (TW); Tsung-Lin Yu, Yilan County (TW)

(73) Assignee: Silicon Motion Technology (Hong Kong) Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,195

(22) Filed: Nov. 17, 2021

(65) Prior Publication Data

US 2022/0075528 A1 Mar. 10, 2022

Related U.S. Application Data

(63) Continuation of application No. 14/184,801, filed on Feb. 20, 2014, now Pat. No. 11,209,987.

(51) Int. Cl.
*G06F 3/06* (2006.01)

(52) U.S. Cl.
CPC .......... *G06F 3/0613* (2013.01); *G06F 3/0605* (2013.01); *G06F 3/0632* (2013.01); *G06F 3/0689* (2013.01)

(58) Field of Classification Search
None
See application file for complete search history.

(56) References Cited

U.S. PATENT DOCUMENTS

2011/0137870 A1* 6/2011 Feder .................. H04L 67/1001
707/662
2011/0302287 A1* 12/2011 Muppirala .............. H04L 67/61
709/223

* cited by examiner

*Primary Examiner* — Christopher D Birkhimer
(74) *Attorney, Agent, or Firm* — Winston Hsu

(57) ABSTRACT

A storage system and an access control method thereof are provided. The storage system receives a first I/O request from at least one hypervisor. The first I/O request is used for accessing a first disk file of disk files. The storage system then operates a first I/O operation of a first virtual disk of virtual disks according to the first I/O request since the disk files correspond to the virtual disks. The storage system reads a QoS data of the first disk file and determines a first delay period according to the QoS data. The storage system transmits a first I/O response to the at least one hypervisor after the first delay period.

4 Claims, 5 Drawing Sheets

STORAGE SYSTEM STORING A PLURALITY OF DISK FILES WHICH CORRESPOND TO A PLURALITY OF VIRTUAL DISKS AND ACCESS CONTROL METHOD THEREOF

CROSS REFERENCE TO RELATED APPLICATIONS

This is a continuation of the co-pending U.S. application Ser. No. 14/184,801 (filed on 2014 Feb. 20). The entire content of the related applications is incorporated herein by reference.

BACKGROUND OF THE INVENTION

1. Field of the Invention

The present invention relates to a storage system and an access control method thereof; more specifically, the storage system and the access control method thereof can allocates I/O operation for virtual machines averagely.

2. Description of the Prior Art

In conventional virtualized computation model, there are many virtual machines running on a storage system, and I/O resource of the storage system is shared with the virtual machines. Accordingly, if one of the virtual machines performs heavier I/O loading on the storage system, it might cause I/O latency to other virtual machines, which may decrease the entire I/O efficiency. Therefore, quality of service (QoS) of the storage system becomes a serious issue in this field.

In prior art, some use an I/O scheduler in a hypervisor for scheduling I/O operations of the virtual machines to improve the QoS of the storage system. Accordingly, the I/O operations of the virtual machines under the hypervisor are fairly allocated. However, if there are more than one hypervisors connecting with the storage system, I/O latency might cause as well since there may be one hypervisor performing heavier I/O loading on the storage system. Further, if there are hypervisors executing different virtualization platforms, the management of the hypervisors connecting with the storage system is more complicated.

Moreover, some use a volume-based control on the storage system directly to improve the QoS of the storage system. Accordingly, the storage system can directly control the QoS of the I/O operations based on the pre-limited volume of the storage system for each virtual machines. However, although it seems that the QoS of the storage system is improved, the resource of the storage is still not allocated to the virtual machines (or a hypervisor) fairly since there may be still a virtual machine (or a hypervisor) occupying the I/O resource of the storage system. Further, if the number of the virtual machines (or hypervisors) increases, it is more difficult to manage the pre-limited volume of the storage system for the new added virtual machines (or hypervisors).

Accordingly, an urgent need exists in the art to develop a new mechanism for improving QoS of the storage system.

SUMMARY OF THE INVENTION

The primary objective of this invention is to provide an access control method for use in a storage system. The storage system connects to at least one hypervisor server and stores a plurality of disk files which correspond to a plurality of virtual disks respectively. The access control method comprises: (a) enabling the storage system to receive an first I/O request from the at least one hypervisor, wherein the first I/O request is used for accessing a first disk file of the disk files; (b) enabling the storage system to operate an first I/O operation of a first virtual disk of the virtual disks according to the first I/O request; (c) enabling the storage system to read a first quality of service (QoS) data of the first disk file; (d) enabling the storage system to determine a first delay period according to the QoS data; (e) enabling the storage system to transmit a first I/O response to the at least one hypervisor after the first delay period.

Another objective of this invention is to provide a storage system. The storage system comprises an I/O interface, a storage unit and a processing unit. The I/O interface is configured to connect to at least one hypervisor server and to receive an first I/O request from the at least one hypervisor. The first I/O request is used for accessing a first disk file of the disk files. The storage unit is configured to store a plurality of disk files which correspond to a plurality of virtual disks respectively. The processing unit is configured to operate an first I/O operation of a first virtual disk of the virtual disks according to the first I/O request, to read a first quality of service (QoS) data of the first disk file, and to determine a first delay period according to the QoS data. The I/O interface is further configured to transmit a first I/O response to the at least one hypervisor after the first delay period.

The detailed technology and preferred embodiments implemented for the subject invention are described in the following paragraphs accompanying the appended drawings for people skilled in this field to well appreciate the features of the claimed invention.

These and other objectives of the present invention will no doubt become obvious to those of ordinary skill in the art after reading the following detailed description of the preferred embodiment that is illustrated in the various figures and drawings.

DETAILED DESCRIPTION

In the following description, the present invention will be explained with reference to embodiments thereof. However, these embodiments are not intended to limit the present invention to any environment, applications or implementations described in these embodiments. Therefore, description of these embodiments is only for purpose of illustration rather than to limit the present invention. In the following embodiments and the attached drawings, elements unrelated to the present invention are omitted from depiction; and dimensional relationships among individual elements in the following attached drawings are illustrated only for ease of understanding, but not to limit the actual scale.

Figure 1:
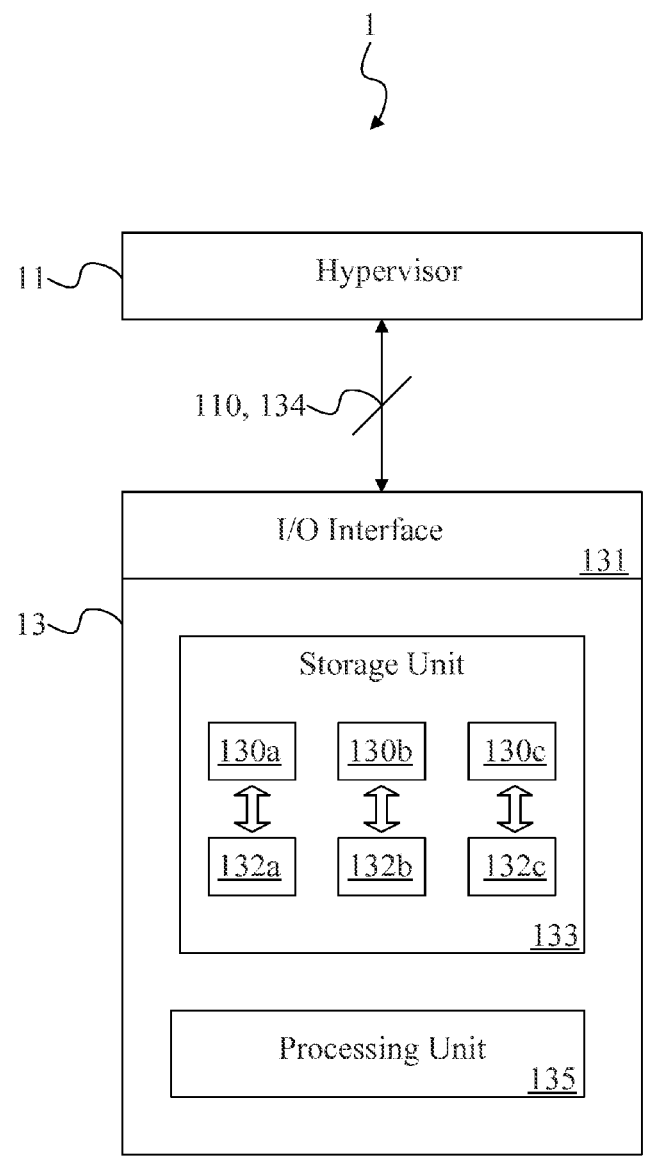
FIG. 1 is a schematic view of a virtualized computation model according to a first embodiment of the present invention.

Please refer to FIG. 1. FIG. 1 is a schematic view of a virtualized computation model 1 according to a first embodiment of the present invention. The virtualized computation model 1 comprises at least one hypervisor 11 and a storage system 13. The storage system 13 comprises an I/O interface 131, a storage unit 133 and a processing unit 135. The I/O interface 131 connects to the at least one hypervisor 11. The storage unit 133 stores a plurality of disk files 130a~c which correspond to a plurality of virtual disks 132a~c respectively. Interactions between the individual elements will be further described hereinafter.

First of all, when the at least one hypervisor 11 needs to access a first disk file 130 a of the storage system 13, the at least one hypervisor 11 transmits a first I/O request 110 to the storage system 13. Then, the I/O interface 131 of the storage system 13 receives the first I/O request 110. Afterwards, since the first disk file 130 a is corresponding to a first virtual disk 132 a, the processing unit 135 operates a first I/O operation (not shown) of a first virtual disk 132 a according to the first I/O request 110.

Next, after the first I/O operation completes, the processing unit 135 of the storage system 13 reads a first quality of service (QoS) data (not shown) recorded with the first disk file 130 a and determines a first delay period (not shown) according to the QoS data. Then, the I/O interface 131 of the storage system 13 then transmits a first I/O response 134 to the at least one hypervisor 11 after the first delay period passes. Accordingly, the accessing QoS of the first virtual disk 132 a can be control.

More specifically, the QoS data of the first disk file 130 a records the QoS requirement of the first virtual disk 132a. Therefore, the processing unit 135 can use the first delay period to delay the first I/O response 134 for suspending the subsequent I/O operations of the at least one hypervisor 11 for balancing the I/O QoS of the virtual disk 132 a.

Figure 2:
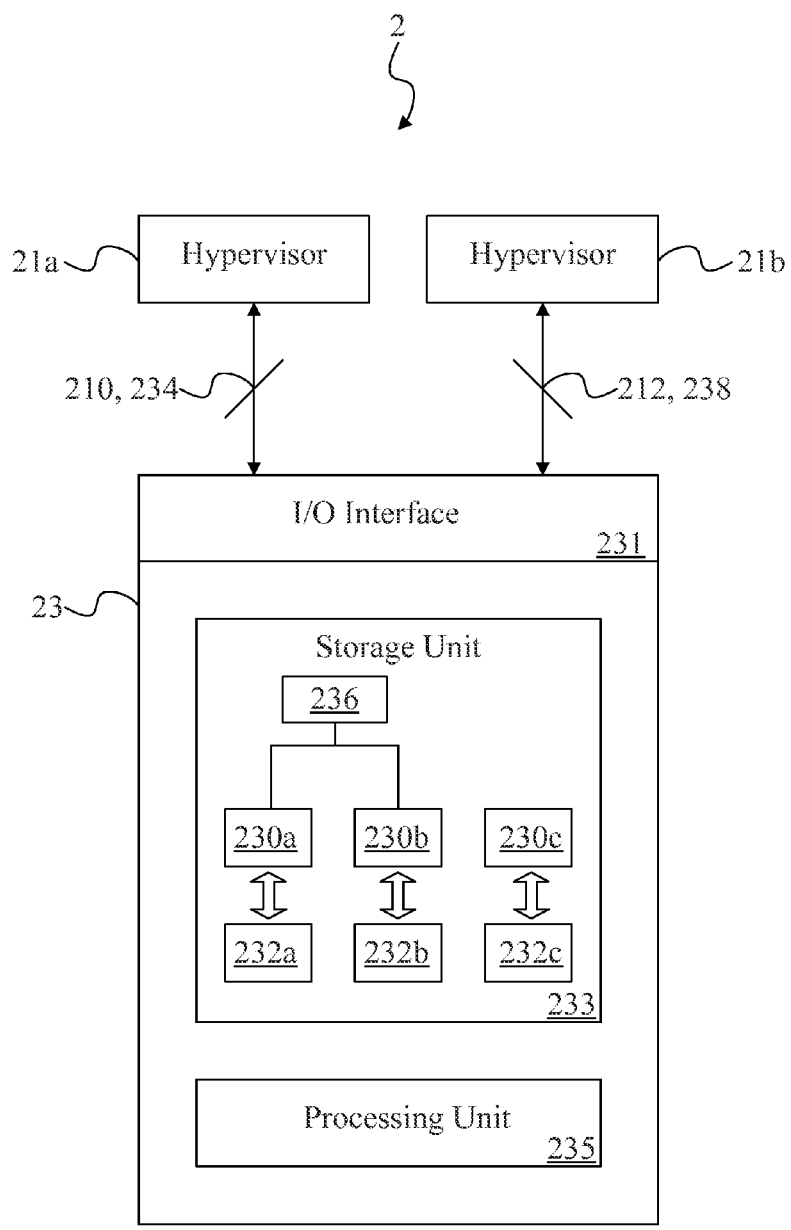
FIG. 2 is a schematic view of a virtualized computation model according to a second embodiment of the present invention.

Please refer to FIG. 2. FIG. 2 is a schematic view of a virtualized computation model 2 according to a second embodiment of the present invention. The virtualized computation model 2 comprises a plurality of hypervisor 21 a-b and a storage system 23. The storage system 23 comprises an I/O interface 231, a storage unit 233 and a processing unit 235. The I/O interface 231 connects to the hypervisors 21 a~b. The storage unit 233 stores a plurality of disk files 230 a~c which correspond to a plurality of virtual disks 232 a~c respectively. Interactions between the individual elements will be further described hereinafter.

First of all, when the hypervisor 21 a needs to access a first disk file 230a of the storage system 23, the hypervisor 21 a transmits a first I/O request 210 to the storage system 23. Then, the I/O interface 231 of the storage system. 23 receives the first I/O request 210. Afterwards, since the first disk file 230 a is corresponding to a first virtual disk 232a, the processing unit 235 operates a first I/O operation (not shown) of a first virtual disk 232a according to the first I/O request 210.

Next, after the first I/O operation completes, the processing unit 235 of the storage system 23 reads a first quality of service (QoS) data (not shown) of the first disk file 230 a and determines a first delay period (not shown) according to the QoS data. Then, the I/O interface 231 of the storage system 23 then transmits a first I/O response 234 to the hypervisor 21 after the first delay period passes. Accordingly, the accessing QoS of the first virtual disk 232 a can be control.

Particularly, the QoS data of the first disk file 230 a comprises an input output per second (IOPS) information (not shown) and an I/O bandwidth information (not shown) of the first virtual disk 232a. Therefore, the processing unit 135 can determine the first delay period according to the TOPS information or the I/O bandwidth information and use the first delay period to delay the first I/O response 234 for suspending the subsequent I/O operations of the at least one hypervisor 21 for balancing the I/O QoS of the virtual disk 232a.

It should be noted that the QoS data can be recorded with the first disk file 230a directly or recorded with a dictionary 236 of the first disk file 230a. If the QoS data is recorded with the dictionary 236, the disk files stored under the dictionary 236 can be set as the same QoS setting. In the following descriptions, only the details of recording the QoS data with the dictionary 236 will be further explained since the details of recording the QoS data with the disk file have been disclosed in the first embodiment.

Particularly, in the second embodiment, the first disk file 230a and a second file 230b are stored under the dictionary 236, and the QoS data is recorded with the dictionary 236. Accordingly, when the hypervisor 21 b needs to access a second disk file 230b of the storage system 23, the hypervisor 21b transmits a second I/O request 212 to the storage system 23. Then, the I/O interface 231 of the storage system. 23 receives the second I/O request 212. Afterwards, since the first disk file 230b is corresponding to a second virtual disk 232b, the processing unit 235 operates a second I/O operation (not shown) of the second virtual disk 232b according to the second I/O request 212.

Similarly, after the second I/O operation completes, the processing unit 235 of the storage system 23 reads the QoS data of the second disk file 230b from the dictionary 236 since the QoS data is recorded with the dictionary 236, and determines a second delay period (not shown) according to the QoS data. Then, the I/O interface 231 of the storage system 23 then transmits a second I/O response 238 to the hypervisor 21b after the second delay period passes. Accordingly, the accessing QoS of the second virtual disk 232b can be control as well.

It should be noted that the file disks of the present invention can be stored as a tree-like file system with dictionaries. Accordingly, the virtual disks can be managed as the files stored in the tree-like file system since the virtual disks correspond to the file disks.

Figure 3:
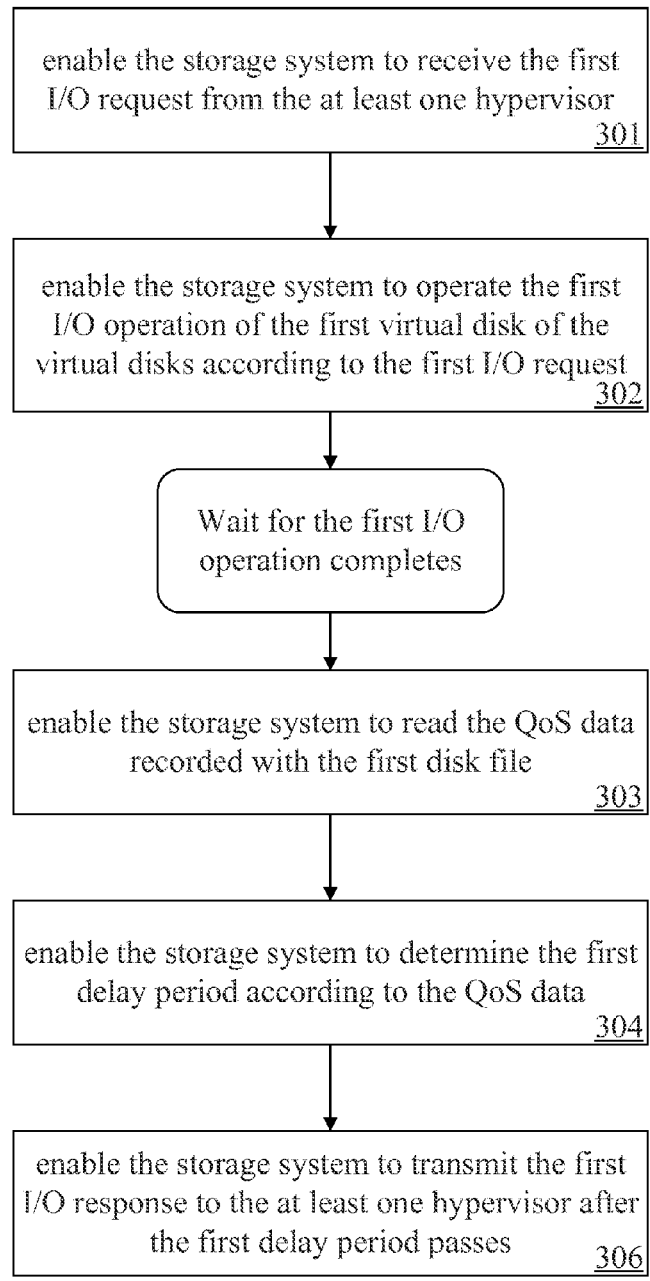
FIG. 3 is a flowchart diagram of an access control method according to a third embodiment of the present invention.

A third embodiment of the present invention is an access control method, a flowchart diagram of which is shown in FIG. 3. The access control method of the third embodiment is used in a storage system (e.g., the storage system of the aforesaid embodiments). The storage system connects to at least one hypervisor server and stores a plurality of disk files which correspond to a plurality of virtual disks respectively. The detailed steps of the third embodiment are as follows.

First, when the at least one hypervisor needs to access a first disk file of the storage system, the at least one hypervisor transmits a first I/O request to the storage system. Then, step 301 is executed to enable the storage system to receive the first I/O request from the at least one hypervisor. Step 302 is executed to enable the storage system to operate a first I/O operation of a first virtual disk of the virtual disks according to the first I/O request.

After first I/O operation completes, step 303 is executed to enable the storage system to read a QoS data recorded with the first disk file. Step 304 is executed to enable the storage system to determine a first delay period according to the QoS data. Step 305 is executed to enable the storage system to transmit a first I/O response to the at least one hypervisor after the first delay period passes.

Figure 4A:
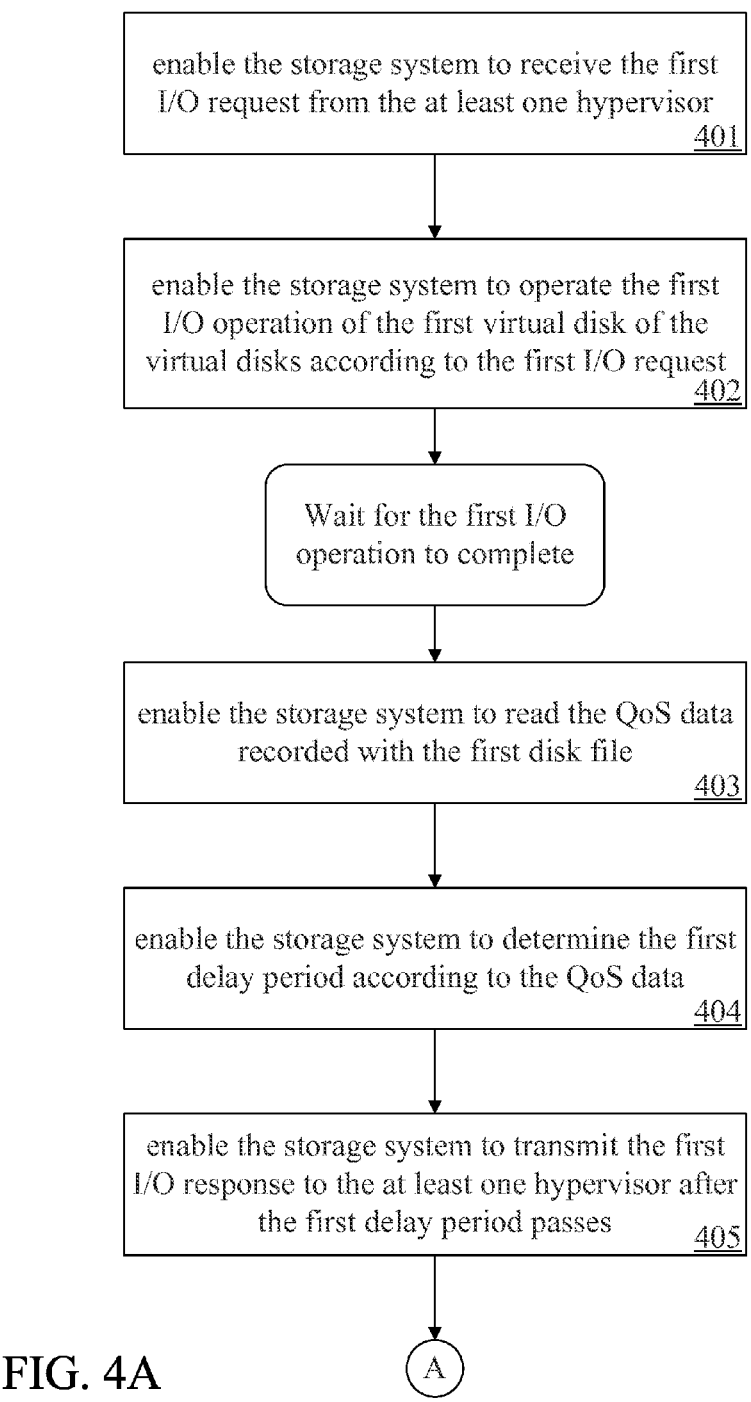
FIGS. 4A-4B are flowchart diagrams of an access control method according to a fourth embodiment of the present invention.
Figure 4B:
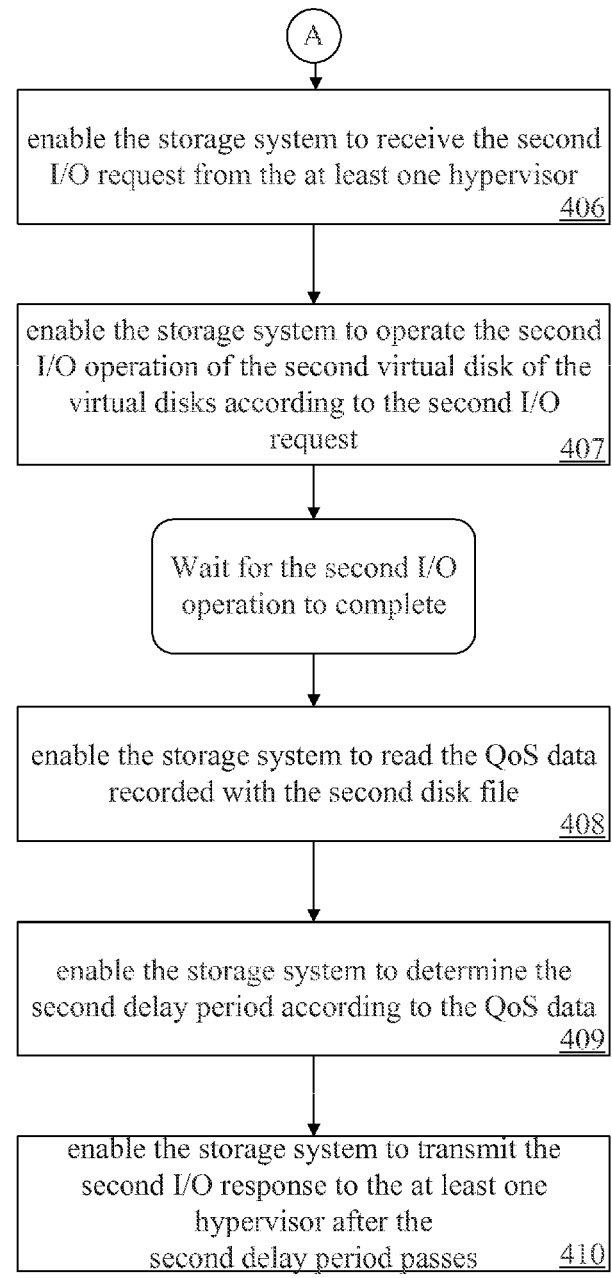

A fourth embodiment of the present invention is an access control method, a flowchart diagram of which is shown in FIGS. 4A-4B. The access control method of the fourth embodiment is used in a storage system (e.g., the storage system of the aforesaid embodiments). The storage system connects to at least one hypervisor server and stores a plurality of disk files which correspond to a plurality of virtual disks respectively. The detailed steps of the fourth embodiment are as follows.

First, when the at least one hypervisor needs to access a first disk file of the storage system, the at least one hypervisor transmits a first I/O request to the storage system. Then, step 401 is executed to enable the storage system to receive the first I/O request from the at least one hypervisor. Step 402 is executed to enable the storage system to operate a first I/O operation of a first virtual disk of the virtual disks according to the first I/O request.

After first I/O operation completes, step 403 is executed to enable the storage system to read a QoS data of the first disk file. It should be noted that the QoS data comprises an IOPS information and an I/O bandwidth information. Step 404 is executed to enable the storage system to determine a first delay period according to the IOPS information and the I/O bandwidth information of the QoS data. Step 405 is executed to enable the storage system to transmit a first I/O response to the at least one hypervisor after the first delay period passes.

It should be noted that the QoS data can be recorded with the disk files directly or recorded with a dictionary of the first disk files. If the QoS data is recorded with the dictionary, the disk files stored under the dictionary can be set as the same QoS setting. In the following descriptions, the details of recording the QoS data with the dictionary will be further explained.

First, when the at least one hypervisor needs to access a second disk file of the storage system, the at least one hypervisor transmits a second I/O request to the storage system. Then, step 406 is executed to enable the storage system to receive the second I/O request from the at least one hypervisor. Step 407 is executed to enable the storage system to operate a second I/O operation of a second virtual disk of the virtual disks according to the second I/O request.

Next, after the second I/O operation completes, step 408 is executed enable the storage system to read the QoS data of the second disk file from the dictionary since the first disk file and the second disk file are stored in the same dictionary. Step 409 is executed to enable the storage system to determine a second delay period according to the QoS data. Step 410 is executed to enable the storage system to transmit a second I/O response to the at least one hypervisor after the second delay period.

According to the above descriptions, the storage system of the present invention can use the disk files to correspond to the virtual disks, and provide the disk files for the hypervisor to operate the I/O operations of the storage system. Therefore, since the QoS setting are recorded with the disk files or with the dictionary of the disk files, the QoS of I/O operations of the virtual disks can be controlled fairly by adjusting the QoS setting of the disk files, and the management of the virtual disks is easier through the disk files of the tree-like file system.

The above disclosure is related to the detailed technical contents and inventive features thereof People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An access control method for use in a storage system, the storage system connecting to at least one hypervisor server and storing a plurality of disk files which correspond to a plurality of virtual disks respectively, the disk files being stored as a file system in a storage unit, the access control method comprising:
   receiving, at the storage system, a first I/O request from the at least one hypervisor server, wherein the first I/O request is configured to access a first disk file of the disk files;
   operating, by the storage system, a first I/O operation of a first virtual disk of the virtual disks according to the first I/O request;
   reading, by the storage system, a quality of service (QoS) data of the first disk file, wherein the QoS data comprises an input output per second (IOPS) information and an I/O bandwidth information;
   determining, by the storage system, a first delay period according to the IOPS information of the first disk file and the I/O bandwidth information of the first disk file; and
   suspending a subsequent I/O operation of the first disk file for a time duration associated with the first delay period to balance an I/O QoS of the first virtual disk by transmitting, by the storage system, a first I/O response to the at least one hypervisor server only after expiration of the first delay period has passed.

2. The access control method of claim 1, wherein the QoS data is recorded with the first disk file.

3. The access control method of claim 1, wherein the QoS data is recorded with a dictionary of the first disk file.

4. The access control method of claim 1, further comprising:
   receiving, at the storage system, a second I/O request from the at least one hypervisor server, wherein the second I/O request is configured to access a second disk file of the disk files;
   operating, by the storage system, a second I/O operation of a second virtual disk of the virtual disks according to the second I/O request;
   reading, by the storage system, the QoS data of the second disk file;
   determining, by the storage system, a second delay period according to the IOPS information of the second disk file and the I/O bandwidth information of the second disk file; and
   suspending a subsequent I/O operation of the second disk file for a time duration associated with the second delay period to balance an I/O QoS of the second virtual disk by transmitting, by the storage system, a second I/O response to the at least one hypervisor server only after expiration of the second delay period has passed.

* * * * *